O. T. BACKLUND.
SLEIGH ATTACHMENT FOR AUTOVEHICLES.
APPLICATION FILED MAR. 5, 1919.
1,394,514.
Patented Oct. 18, 1921.
2 SHEETS—SHEET 1.
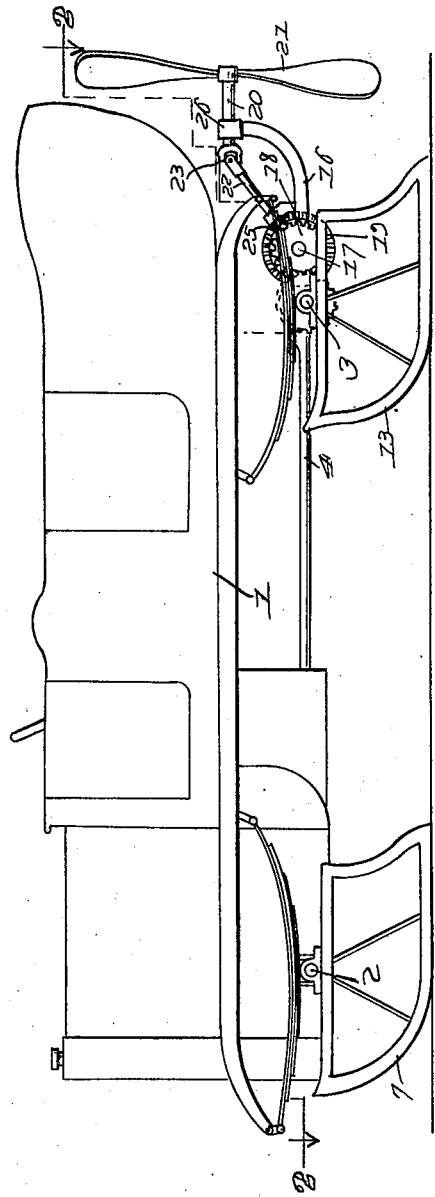
Fig. 1.
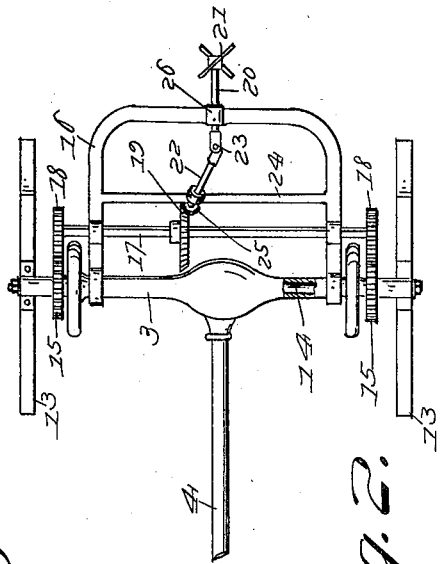
Fig. 2.
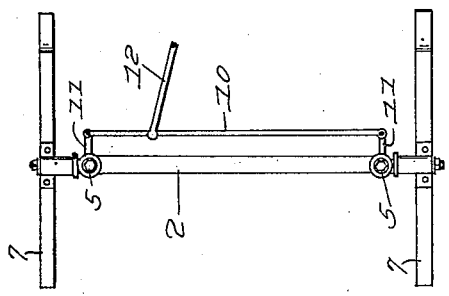
Inventor
Oscar T. Backlund,
By
Attorney O. T. BACKLUND.
SLEIGH ATTACHMENT FOR AUTOVEHICLES.
APPLICATION FILED MAR. 5, 1919.
1,394,514.
Patented Oct. 18, 1921.
2 SHEETS—SHEET 2.
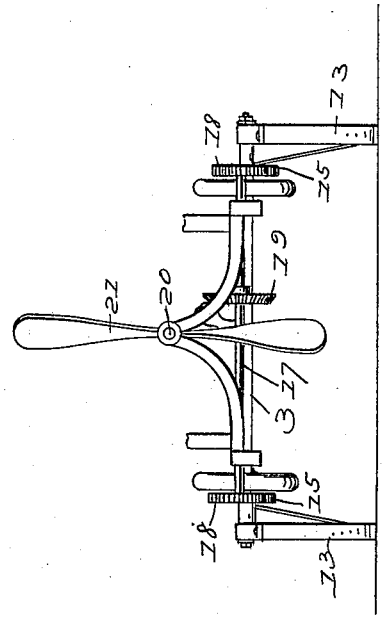
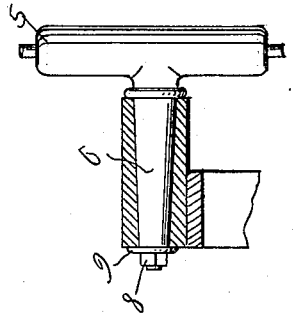
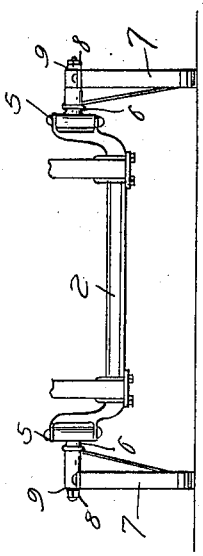
Inventor
Oscar T. Backlund,
By
Attorney

UNITED STATES PATENT OFFICE.

OSCAR T. BACKLUND, OF DEER LODGE, MONTANA.

SLEIGH ATTACHMENT FOR AUTOVEHICLES.

1,394,514.   Specification of Letters Patent.   Patented Oct. 18, 1921.

Application filed March 5, 1919. Serial No. 280,803.

*To all whom it may concern:*

Be it known that I, OSCAR T. BACKLUND, a citizen of the United States of America, residing at Deer Lodge, in the county of Powell and State of Montana, have invented new and useful Improvements in Sleigh Attachments for Autovehicles, of which the following is a specification.

The object of the invention is to provide a device for use in conjunction with auto vehicles whereby the latter may be readily converted into an auto sleigh. To this end the invention comprises a runner for each of both stub axles for a vehicle and likewise a pair of runners for mounting on the rear or driving axle, the invention, however, providing for the attachment of gears on the driving or differential axle and having a frame also mounted on the rear axle but carried by the casing thereof, the frame supporting a rotatably mounted counter shaft and an air propeller, the counter shaft being operatively connected with the differential axle by the two aforesaid gears carried by it and the countershaft in turn being operatively connected to the propeller.

A further object of the invention is to provide an attachment of this kind which is simple in construction, durable and effective in operation, inexpensive and easy of application.

Other and further objects appear in the following description wherein the invention is set forth in detail.

As shown and described, a specific embodiment of the invention is adhered to, but to this embodiment it is not to be restricted. The right is reserved to make such changes or alterations as the actual reduction to practice may suggest, in so far as such changes or alterations are compatible in spirit with the annexed claim.

In the accompanying drawings:

Figure 1 is a view in side elevation showing the practical application of the invention.

Fig. 2 is a section on the line 2—2 of Fig. 1.

Fig. 3 is a front elevational view of the forward runners and the forward axle of the vehicle.

Fig. 4 is a rear elevational view of the rear runners and the driving propeller.

Fig. 5 is a detailed view partly in section and partly in elevation showing the manner of mounting the runners on the front stub axle.

Referring to the drawings, there is shown an auto vehicle body 1 having the forward axle 2 and the rear axle 3 with the usual transmission shaft 4 connecting with the differential carried by the rear axle.

On the front axle 2 the usual knuckle joints 5 are provided for the support of the stub axles 6 from which the usual wheels are moved to permit the attachment of the runners 7, these runners being held on the stub axles by the nuts 8 and washers 9 previously employed to secure the front wheels to the stub axles. The stub axles are operatively connected together by a connecting rod 10, which pivotally connects with the arms 11 formed with the knuckles of the stub axle. Thus the two runners 7 may be turned for guiding purposes by means of the connecting rod 12 which leads in the usual manner to the steering mechanism of the vehicle.

On the rear axle 3 the runners 13 are carried, these runners being mounted on the extremities of the differential shaft sections 14, so that the latter may turn freely in the runners. There are also carried by the sections 14 of the differential shaft the gears 15. These latter are interposed between the runners and the housing for the differential shaft and are rigidly mounted on the two sections 14 so that they may turn with the latter.

To provide means for mounting an appropriate air propeller for the sleigh there is provided a frame 16, which is secured to the rear axle 3 but attached to the housing for the differential shaft and this frame 16 supports in appropriate bearings formed on it the counter shaft 17, the latter carrying at its ends the gears 18 meshing with the gears 15 and further carrying at an intermediate point the beveled gear 19.

The frame 16 is formed at the rear with a bearing 26 in which a propeller shaft 20 is journaled, this propeller shaft carrying a propeller 21 at its rear end and at its forward end being connected with a shaft 22 by means of a universal joint 23. The shaft 22 is journaled in appropriate bearings formed on a transverse member 24 of the frame and this shaft carries at its lower end—the shaft being inclined downwardly—a beveled pinion meshing with the beveled gear 19.

In the operation of the invention it is obvious that the differential shaft comprising the sections 14 being driven by the transmission shaft 4 will communicate motion to the countershaft 17, this motion being in turn communicated to the propeller 21 to cause the latter to propel the sleigh by its action against the air. Since the differential is necessary to a wheel driven machine, such as an auto vehicle to prevent its making curves, this usual function of the differential is not destroyed when the sleigh attachment is employed, but since with the sleigh attachment the propulsion is effected by an air propeller, it is not necessary for the differential axle to operate as such and when it is connected to the counter shaft 17, as shown, the differential axle becomes a fixed mechanism and motion is positively transmitted to the propeller to drive it in the proper direction.

The invention having been described, what is claimed as new and useful is:

The combination with an auto vehicle having forward and rear axles, the latter of which is a differential axle, of runners mounted on both axles, a frame mounted on the rear axle, a propeller rotatably mounted in the frame, a countershaft journaled in the frame, gears carried at the ends of the countershaft, gears carried on the two sections of the differential axle and meshing with the aforesaid gears, a beveled gear mounted on the countershaft, a second shaft journaled in the frame, a beveled gear carried by said second shaft and meshing with the first said beveled gear, and a universal connection between said latter shaft, and the propeller whereby motion is transmitted to the latter in the manner specified.

In testimony whereof I affix my signature.

OSCAR T. BACKLUND.